United States Patent [19]

Ferraro

[11] Patent Number: 5,718,142

[45] Date of Patent: Feb. 17, 1998

[54] METAL STITCHER

[76] Inventor: Ronald M. Ferraro, 3604 Knoll Dr., Crystal Lake, Ill. 60012

[21] Appl. No.: 504,764

[22] Filed: Jul. 20, 1995

[51] Int. Cl.$^6$ .................................................. B21D 31/02
[52] U.S. Cl. ..................... 72/326; 29/514; 29/521; 72/294; 72/453.16
[58] Field of Search .......................... 72/294, 312, 325, 72/326, 453.16, 464, 335, 453.15; 29/509, 514, 521, 243.5

[56] References Cited

U.S. PATENT DOCUMENTS

| | | |
|---|---|---|
| 1,306,920 | 6/1919 | Miller . |
| 1,924,312 | 2/1933 | Williams . |
| 2,426,670 | 9/1947 | Cooley . |
| 3,465,414 | 9/1969 | Koett . |
| 3,848,505 | 11/1974 | Wilson . |
| 3,925,875 | 12/1975 | Doke ................................ 29/521 |
| 4,096,727 | 6/1978 | Gargaillo ........................... 72/312 |
| 4,403,409 | 9/1983 | Richards . |
| 4,479,287 | 10/1984 | Asaka ................................ 72/325 |
| 4,658,502 | 4/1987 | Eckold et al. . |
| 4,827,595 | 5/1989 | Dacey, Jr. .......................... 29/509 |
| 4,918,810 | 4/1990 | Anderson . |
| 5,022,253 | 6/1991 | Parlatore ........................... 72/326 |
| 5,123,270 | 6/1992 | Salvagnini ......................... 72/312 |
| 5,207,086 | 5/1993 | Kynl . |

FOREIGN PATENT DOCUMENTS 0263830  11/1987  Japan ..................... 72/326

*Primary Examiner*—Lowell A. Larson
*Assistant Examiner*—John Paradiso
*Attorney, Agent, or Firm*—Charles F. Meroni, Jr.; Robert Toczycki

[57] ABSTRACT

A hand-held portable power tool for use in an operation for joining and fastening two or more abutting steel plates, the tool comprises: a housing unit; a clamp, a punch, a power mechanism and a punch actuator. The clamp is mounted on the housing unit and is movable from an open position to a clamped position. The clamped position is a position that enables the clamp to hold the abutting steel plates together and prohibit them from moving in relationship to each other. The punch is mounted within the housing unit and has a hollow ground chisel shape. The power mechanism is engageable with the punch and the clamp. The power mechanism is of sufficient capacity to clamp and hold the abutting steel plates together and to drive the punch through the abutting steel plates. The punch actuator is actuatable from an off position to an on position. When the punch actuator is actuated to the on position, the power mechanism engages with the clamp and moves the clamp to the clamped position holding the abutting steel plates together and the power mechanism engages with the punch and drives the punch through the abutting steel plates, wherein an end of the punch that has the hollow ground chisel shape is used to penetrate the steel plates. The punch has a piercing lead-in tip for entering a back end of holes to be punched in the abutting steel plates, whereby when the piercing lead-in tip is driven by the power mechanism into the steel plates, material is punched out of the steel plates to form holes and is progressively moved to form abutting spiral shaped cut-out steel plate segments in locked fastening engagement to secure the abutting steel plates in unitary assembly.

18 Claims, 5 Drawing Sheets

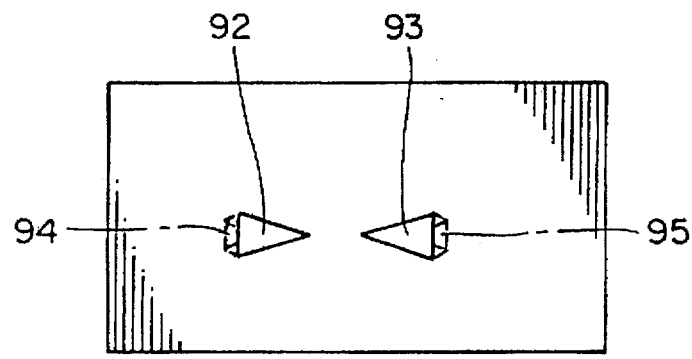
Fig. 19          Fig. 20
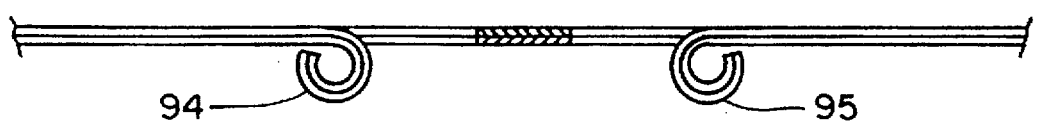
Fig. 21

METAL STITCHER

BACKGROUND OF THE INVENTION

1. Field of the Invention

The present invention relates to a new method of fastening steel plates together wherein a punch is used to pierce through and perforate two or more abutting steel plates with the resulting perforated metal being folded underneath the lowermost steel plate to form a fastener locking the abutting steel plates together. The present invention further relates to an apparatus adapted to implement the fastening method and to the resulting fastening joint formed by the perforated abutting steel plates. More particularly, this invention can be used to secure steel studs and the like used in the construction of new homes.

2. Description of the Prior Art

Thin sheets of metal and steel plates have been joined by various physical methods over the ages. General methods of common use today consist of using fastening devices such as screws, rivets, etc. It has further become common in the construction industry to use metal 2×4's versus wooden 2×4's. Metal beams are stronger than wooden beams and can also cost less than their wooden counterpart. Furthermore, the metal beams are also fire retardant. However, fastening metal beams to each other has become a tedious task since one must usually force a screw through the metal beams. This fastening method takes more time than fastening wooden beams with nails and staples and results in a much longer construction time.

There have been methods of securing metal plates together that do not use screws or rivets. These methods include securing the metal sheets to each other by displacing a portion of one metal sheet into the other with the aid of dies without puncturing both metal sheets. Other methods have also been utilized to punch a portion of both pieces of metal, and then in a separate operation the resultant tangs are folded, expanded or shaped with a die to effect a clinch.

The present invention is different from the prior art in that it punches and clinches in a single operation without the aid of dies or compressing rollers. The present invention, through the use of curved surfaces on the face of the punch perforate the metal causing punched material from the two or more abutting steel plates to be displaced and rolled into at least one pair of spirals or folds thus securing the plates in unitary assembly. In addition, the present invention can be used on location with a simple hand-held power tool.

These and other types of metal fastening devices disclosed in the prior art do not offer the flexibility and inventive features of my metal fastening device. As will be described in greater detail hereinafter, the metal stitcher of the present invention differs from those previously proposed.

SUMMARY OF THE INVENTION

According to my present invention I have provided a hand-held portable power tool for use in an operation for joining and fastening two or more abutting steel plates, the tool comprises: a housing unit; a clamp, the clamp is mounted on the housing unit, the clamp is movable from an open position to a clamped position, the clamped position is a position that enables the clamp to hold the abutting steel plates together and prohibit them from moving in relationship to each other; a punch, the punch is mounted within the housing unit; a power mechanism, the power mechanism is engageable with the punch and the clamp, the power mechanism is of sufficient capacity to clamp and hold the abutting steel plates together and to drive the punch through the abutting steel plates; and a punch actuator, the punch actuator is attached to the housing unit, the punch actuator is actuatable from an off position to an on position, the clamp is in an open position and the punch is in an open position when the punch actuator is in an off position, when the punch actuator is actuated to the on position, the power mechanism engages with the clamp and moves the clamp to the clamped position holding the abutting steel plates together and the power mechanism engages with the punch and drives the punch through the abutting steel plates, the punch has a hollow ground chisel shape, wherein an end of the punch that has the hollow ground chisel shape is used to penetrate the steel plates, the punch has a piercing lead-in tip for entering a back end of holes to be punched in the abutting steel plates, the hollow ground chisel shape has an angle of between 30°–45° as taken from a bottom edge of the piercing lead-in tip relative to a longitudinal axis through the punch, whereby when the piercing lead-in tip is driven by the power mechanism into the steel plates, material is punched out of the steel plates to form holes and is progressively moved to form abutting spiral shaped cut-out steel plate segments in locked fastening engagement to secure the abutting steel plates in unitary assembly.

Another feature of my invention relates to the hand-held portable tool described above, wherein the piercing lead-in tip of the punch penetrates the abutting steel plates at an inclined plane in relationship to the abutting steel plates. Additionally, the punch can also penetrate the abutting steel plates perpendicularly in relationship to the steel plates.

Still another feature of my invention concerns the hand-held portable power tool described above, wherein the punch has a triangular cross-section wherein the triangular cross-section is defined by three points with one of the points being the piercing lead-in tip for penetrating the abutting steel plates. Additionally, the hand-held portable power tool can also have a punch that has a rectangular cross-section wherein the rectangular cross-section is defined by four points with two of the points and an edge between the two points being the piercing lead-in tip for penetrating the abutting steel plates.

Yet another feature of my invention I have provided a hand-held portable power tool as described above, wherein the punch has a pair of side-by-side hollow ground chisel shapes, the punch has a pair of side-by-side piercing lead-in tips for entering a back end of holes to be punched in the abutting steel plates whereby when the piercing lead-in tips are driven by the punch actuator into the steel plates, material is punched out of the steel plates to form holes and is progressively moved to form two abutting spiral shaped cut-out steel plate segments side-by-side in locked fastening engagement to secure the abutting steel plates in unitary assembly. Additionally, the two abutting spiral shaped cut-out steel plate segments are curled in directions away from one another in a direction at right angles to the longitudinal axis through the punch.

According to important features of my invention I have also provided a method of securing two or more abutting steel plates, the method comprises: clamping the abutting steel plates together, the clamping prohibits the abutting steel plates from moving in relationship to each other; and punching the abutting steel plates with a punch, the punch has a hollow ground chisel shape, wherein an end of the punch that has the hollow ground chisel shape is used to penetrate the steel plates, the punch has a piercing lead-in tip for entering a back end of holes to be punched in the abutting steel plates, the hollow ground chisel shape has an angle of between 30°–45° as taken from a bottom edge of the piercing lead-in tip relative to a longitudinal axis through the punch, whereby when the piercing lead-in tip is driven into the steel plates, material is punched out of the steel plates to form holes and is progressively moved to form abutting spiral shaped cut-out steel plate segments in locked fastening engagement to secure the abutting steel plates in unitary assembly.

Other objects, features and advantages of my invention will become more readily apparent upon reference to the following description when taken in conjunction with the accompanying drawings, which drawings illustrate several embodiments of my invention.

DESCRIPTION OF THE DRAWINGS

FIG. 19 is a partial side plan view of the punch used in my dual punch metal stitcher;

FIG. 20 is a top plan view of the holes and joints created by my dual punch metal stitcher; and FIG. 21 is a side plan view showing the spiral joints created by my dual punch metal stitcher.

DETAILED DESCRIPTION OF THE PREFERRED EMBODIMENT

Figure 1:
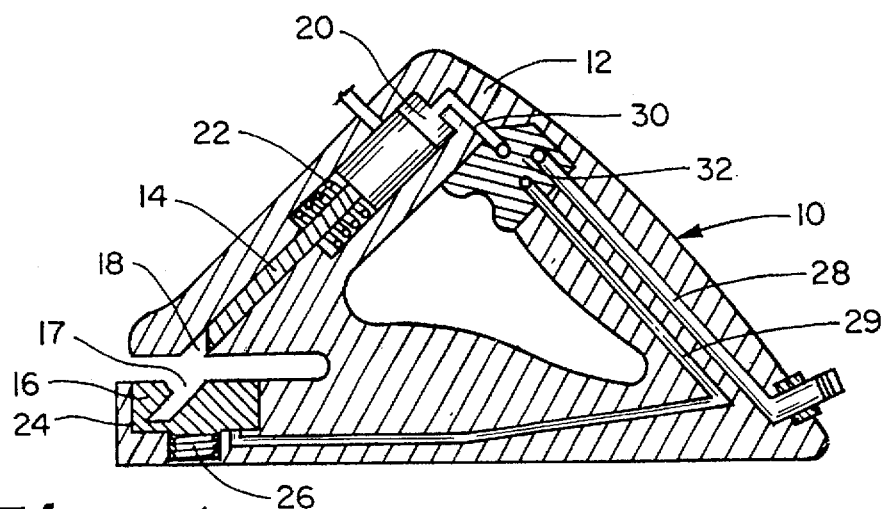
FIG. 1 is a side elevational view with parts broken away and shown in section illustrating my metal stitcher embodying important features of my invention.

Referring now to the drawings, FIG. 1 shows my new and improved metal stitching apparatus 10 in the form of a hand-held tool or a gun. The metal stitching apparatus 10 comprises a housing unit 12. The housing unit contains a single punch 14 and a clamp 16. A front end of the punch 14 extends through a shaft 18 in the housing unit and has a chiseled end to enable it to pierce through steel plates. The shaft 18 extends into a larger compartment 20 within the housing unit. The back end of the punch 14 is contained within the larger compartment and is wider in size than the shaft 18. The compartment 20 is sized to enable the back end of the punch 14 to move back and forth within the compartment and enable the front end of the punch to move in and out of the shaft 18. The punch 14 is kept in an up position within the housing unit by a spring 22.

The clamp 16 is positioned in a compartment 24 below the chiseled end of the punch 14. The clamp 16 is movable to an up position and a down position and is retained within the compartment 24 in a down position by a compression spring 26. The clamp 16 is used to clamp and hold two or more layers of steel plates preparatory to punching and securing the steel plates with the punch 14. The clamp 16 further provides a passage 17 to enable the punch 14 to pierce through layers of steel plates and providing a space for steel plates to fold over creating a secure joint. The metal stitching apparatus further contains powered shafts 28, 29 and 30 controlled by a trigger or a punch actuator 32. These powered shafts 28, 29 and 30 are used to power the metal stitcher enabling the clamp 16 to move to an up position and the punch 14 to move down through the shaft 18 to a punched position. It can be appreciated that the metal stitching apparatus of the present invention can by powered with any suitable form of driving mechanisms. The apparatus can be powered in a number of ways whether it be gas operated or electrically operated, the power, however, being sufficient to enable the punch to penetrate abutting steel plates. More particularly, the power should be sufficient to penetrate steel studs used in the industry of constructing new homes.

Figure 2:
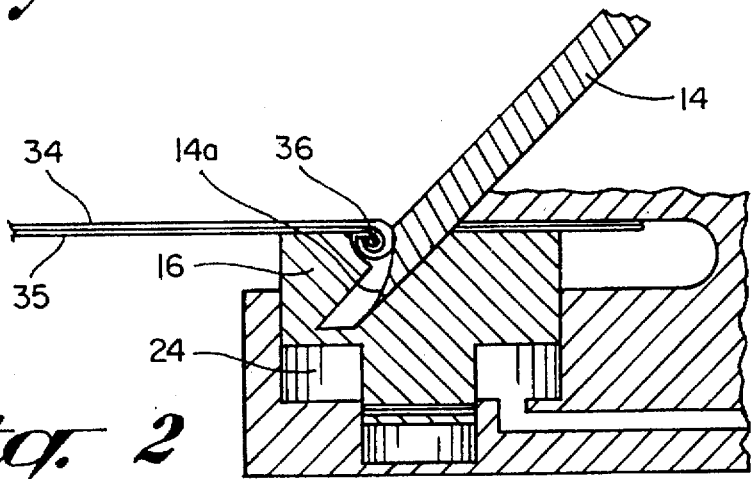
FIG. 2 is an enlarged fragmentary sectional side view of my metal stitcher in an actuated or fired position.

FIG. 2 illustrates my metal stitcher in a punched position and securing abutting steel plates 34, 35. As the trigger is activated, the clamp 16 is moved to an up position and holds the abutting layers of steel plates 34, 35. The punch 14 is then moved to a punched position wherein the chiseled end 14a of the punch pierces the abutting layers of steel plates 34, 35. The chiseled end of the punch 14 is designed to curl the abutting layers of steel plates, thereby providing a secure joint 36.

Figure 3:
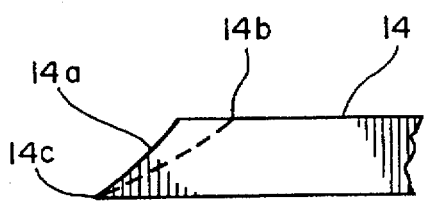
FIG. 3 is a fragmentary or partial side view of the punch used in my metal stitcher.
Figure 4:
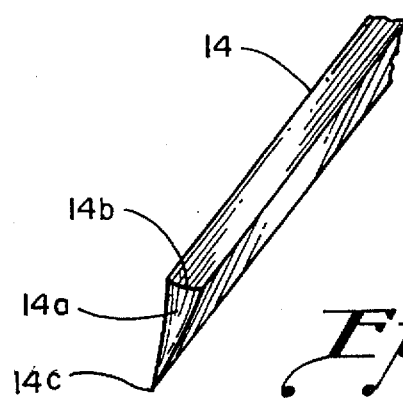
FIG. 4 is a partial perspective view of the punch used in my metal stitcher.
Figure 5:
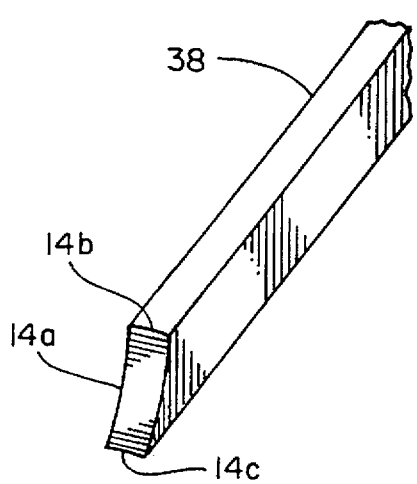
FIG. 5 is a partial perspective view of another type of punch that can be used in my metal stitcher.
Figure 6:
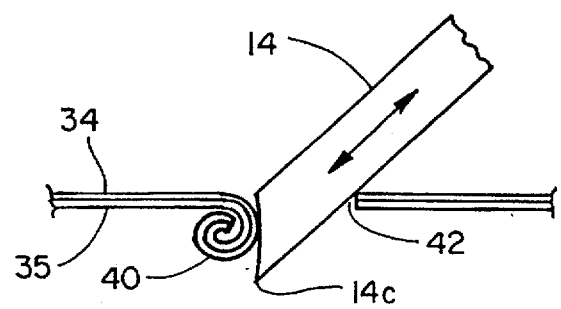
FIG. 6 is a fragmentary or partial sectional side view of my punch penetrating steel plates.

FIGS. 3, 4 and 5 further illustrate the dimensions of the punch 14 on how the face 14a of the chisel has a hollow ground finish. The upper edge of the punch 14b can also have a hollow ground finish. The face of the punch requires a hollow ground surface to enable the punch to curl the abutting layers of steel plates together to form a secure joint fastening the abutting steel plates together. The punch shown in FIGS. 4 and 5 has a hollow ground radius of 3 inches to 6 inches on the face 14a. The height of the punch is 13/32 inches and has a width of ¼ inch across the top of the punch. The punch can be of various different sizes having a size ratio similar to the dimensions of the punch in FIGS. 4 and 5. Furthermore, the punch shown in FIG. 3 shows that the angle of the cutting edge on the punch can be between 30 degrees and 45 degrees regardless of the size of the punch.

FIGS. 4 and 5 also illustrate two different types of punches in which FIG. 4 shows a punch 14 having a triangular cross-section and FIG. 5 shows a punch 38 having a rectangular cross-section. The punch can be made of various sizes and shapes, however, it is necessary that there be a piercing lead-in tip 14c to be able to penetrate steel plates and the punch also needs to have a hollow ground finish on its face in order to provide a cutting action which form the cut-out curled metal segments made by the punch, which when formed provide a spiral lock between two or more spiraled cut-out segments from the abutting steel plates. It is contemplated that the punch is made of a hardened steel of sufficient hardness to enable the punch to penetrate sheet metal and/or steel plates to form the spiraled cut-out locked segments. It is further contemplated that the piercing lead-in tip of the punch is slightly rounded or blunt to prevent the tip of the punch from breaking.

Figure 7:
FIG. 7 is an enlarged sectional side view of the joint created by my metal stitcher.
Figure 8:
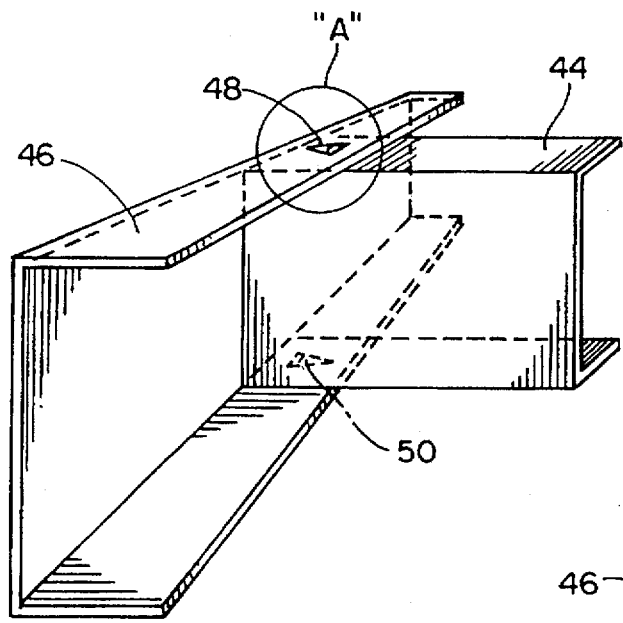
FIG. 8 is a perspective view showing how steel studs are used to join metal plates or channels by my metal stitcher.
Figure 9:
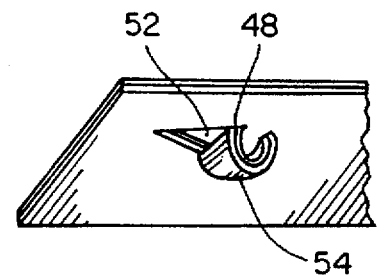
FIG. 9 is an enlarged fragmentary view of the encircled area A of FIG. 7 detailing a spiral joint made by my metal stitcher.
Figure 10:
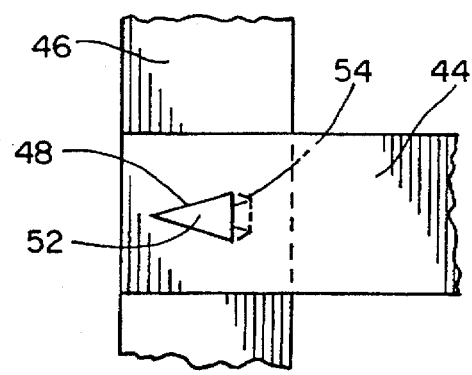
FIG. 10 is a bottom view of the joint shown in FIG. 9.

FIGS. 6-10 further illustrate the type of secure joint 40 that is created by using my metal stitcher. As the punch 14 penetrates the steel plates 34, 35, the piercing lead-in tip 14c of the punch enters a back end 42 of a hole that is created by the punch. As the punch 14 is progressively moved into the abutting steel plates as indicated by the arrow on FIG. 6, the material that is being punched out of the steel plates forms an abutting spiral shaped segment 40 that secures the steel plates to each other. The abutting spiral layers of steel provide a fastening joint that prohibits the separation of the steel plates. FIG. 7 shows an enlarged view of the secure spiral joint 40 in the abutting steel plates created by the punch. FIG. 8 shows how steel studs 44, 46 can be fastened together using the metal stitcher of my invention. Punches 48, 50 are made at the abutting portions of the steel studs. FIG. 9 provides an enlarged perspective view showing the hole 52 created by the punch and the spiral joint 54 created in the steel studs. A bottom view of the fastening spiral joint 54 made in steel studs is shown in FIG. 10.

Figure 11:
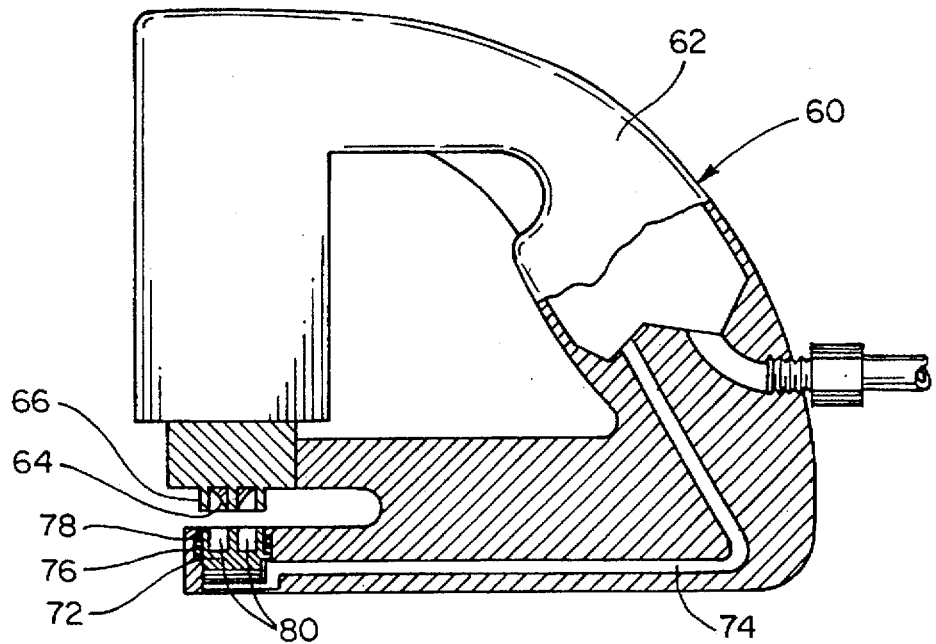
FIG. 11 is a sectional side view of another embodiment of my metal stitcher embodying further features of my invention.
Figure 12:
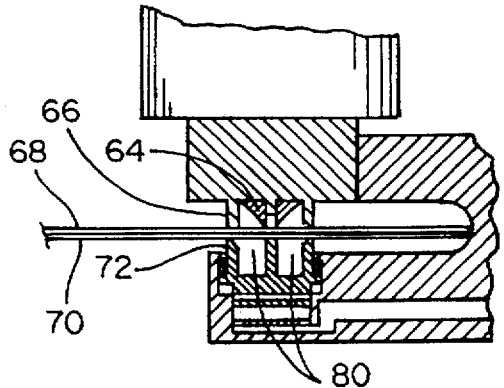
FIG. 12 is a partial sectional side view of my metal stitcher shown in FIG. 11.
Figure 13:
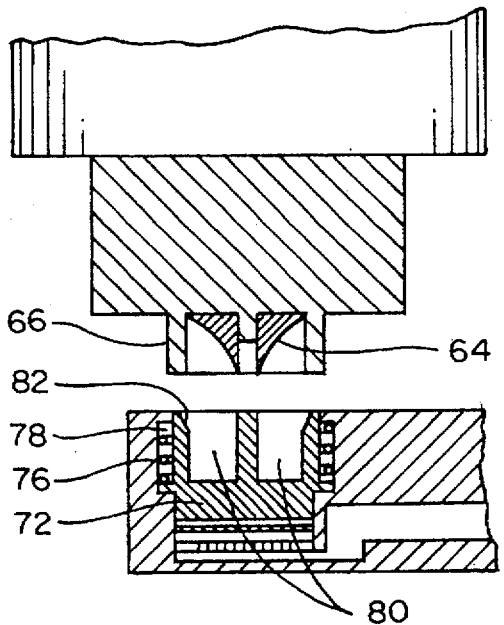
FIG. 13 is an enlarged fragmentary partial sectional side view of my dual punch metal stitcher in an open position.
Figure 18:
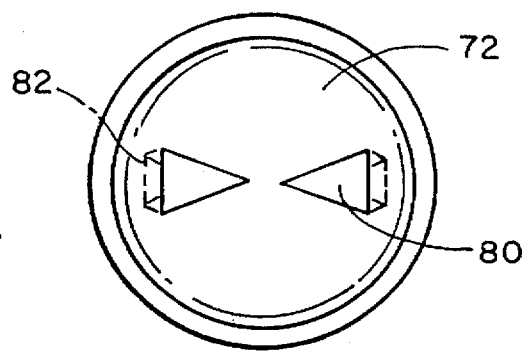
FIG. 18 is a top plan view of the sole plate used in my dual punch metal stitcher.

Another embodiment of my invention is a metal stitcher having a dual punch. FIG. 11 shows my dual punch metal stitcher 60 as a hand held tool or a gun. The metal stitching apparatus comprises a housing unit 62. The housing unit contains a dual punch 64 that is guided through a head plate 66 before piercing through abutting steel plates. FIG. 12 illustrates how the abutting steel plates 68, 70 are clamped between the head plate 66 and the sole plate 72 just before the steel plates are pierced by the dual punch 64. The dual punch is kept in the housing unit of the metal stitcher similarly to the single punch metal stitcher described above. The dual punch, however, does not penetrate the abutting steel plates on an angle like the single punch. The dual punch penetrates the abutting steel plates vertically or perpendicular to the abutting steel plates. Like the clamp in the single punch metal stitcher, the sole plate 72 is movable to an up position when powered through the power shaft 74 and moves back to a down position due to the force of a spring 76 and is retained within a compartment 78 in the housing unit (FIG. 13). The sole plate is used to clamp and hold together two or more layers of abutting steel plates preparatory to punching and securing the steel plates with the dual punch. The sole plate also provides space 80 for the dual punch to penetrate past the abutting steel plates and into a space 80 in the sole plate 72 (FIG. 18). The sole plate also provides a space 82 for the spiral joints to form. Like the single punch apparatus, the dual punch apparatus can be powered by various means such as electrical, gas or high air pressure.

Figure 14:
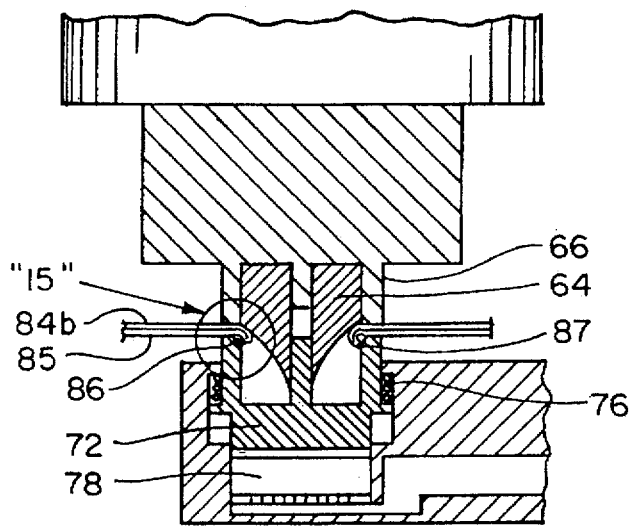
FIG. 14 is an enlarged fragmentary partial sectional side view of my dual punch metal stitcher in a punched position.
Figure 15:
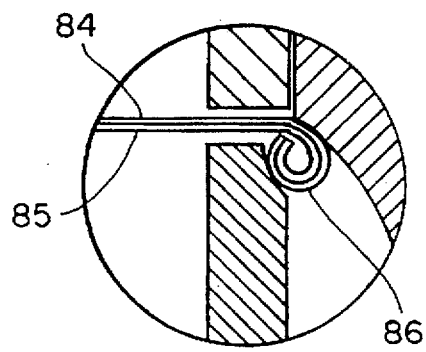
FIG. 15 is an enlarged view of the encircled area B of FIG. 14 detailing the spiral joint made by my dual punch metal stitcher.

FIGS. 14 and 15 illustrate my dual punch in a punched position showing how the abutting steel plates 84, 85 are pierced and fastened by spirals 86, 87. As power is actuated to the punch, the sole plate 72 clamps the abutting steel plates and the dual punch is guided through the head plate and pierces through the steel plates. As material is punched out of the steel plates, holes are formed in the steel plates and the punched out material is progressively moved and curled in directions away from one another to form two abutting spiral shaped fastening joints.

Figure 16:
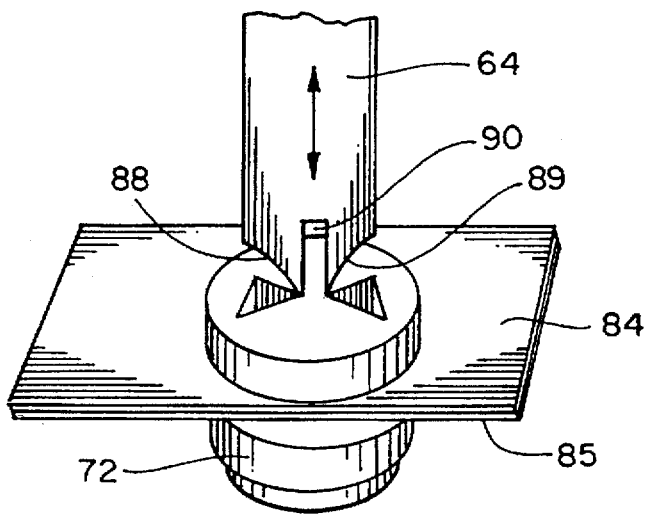
FIG. 16 is a partial perspective view of my punch used in my dual punch metal stitcher.
Figure 17:
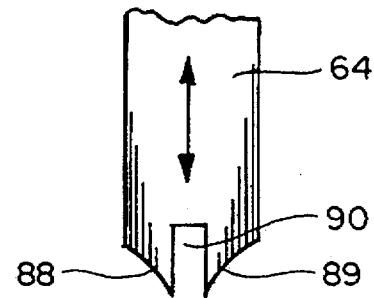
FIG. 17 is a partial side view of my punch used in my dual punch metal stitcher.

The dual punch is also made of a hardened steel of sufficient hardness to enable the punch to penetrate sheet metal and/or steel plates. FIGS. 16, 17 and 19 illustrate in more detail the configuration of the dual punch 64. The dual punch has two chisel shaped punches on one end 88, 89. The face of each chisel shaped punch has a hollow ground finish similar to the single punch described above. Like the hollow ground finish on the single punch, the hollow ground finish on the dual punch is necessary to generate a cutting action which form the cut-out curled metal segments made by the dual punch which when formed provide a pair of spiral locks between two or more spiraled cut-out segments from the abutting steel plates. The dual punch also has a space 90 in between the two chisel shaped punches separating the piercing lead-in tips of the punches 88, 89.

The resulting punched holes 92, 93 and spiral fastening joints 94, 95 created by the dual punch is illustrated in FIGS. 20 and 21. The holes 92, 93 that are punched from the dual punch are triangular in shape opposing one another. The spiral fastening joints 94, 95 are curled away from each other in a direction at right angles to the longitudinal axis through the dual punch. The resulting dual punch creates a more secure engagement between the abutting steel plates since two fasteners are created in opposite directions from each other.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. A hand-held portable power tool for use in an operation for joining and fastening two or more abutting steel plates, the tool comprising:

a housing unit;

clamp means, said clamp means being mounted on said housing unit, said clamp means being movable from an open position to a clamped position, said clamped position being a position that enables said clamp means to hold said abutting steel plates together and prohibit them from moving in relationship to each other;

punch means, said punch means being mounted within said housing unit;

power means, said power means being engageable with said punch means and said clamp means, said power means being of sufficient capacity to clamp and hold said abutting steel plates together and to drive said punch means through said abutting steel plates; and a punch actuator, said punch actuator being attached to said housing unit, said punch actuator being actuatable from an off position to an on position, said clamp means being in an open position and said punch means being in an open position when said punch actuator is in an off position, when said punch actuator is actuated to the on position, said power means engages with said clamp means and moves said clamp means to the clamped position holding said abutting steel plates together and said power means engages with said punch means and drives said punch means through said abutting steel plates, said punch means having a hollow ground chisel shape, wherein an end of said punch means that has the hollow ground chisel shape is used to penetrate the steel plates, said punch means having a piercing lead-in tip for entering a back end of holes to be punched in said abutting steel plates, the hollow ground chisel shape having an angle of between 30°–45° as taken from a bottom edge of said piercing lead-in tip relative to a longitudinal axis through the punch means, whereby when said piercing lead-in tip is driven by said power means into said steel plates, material is punched out of said steel plates to form said holes and is progressively moved to form abutting spiral shaped cut-out steel plate segments in locked fastening engagement to secure the abutting steel plates in unitary assembly.

2. A hand-held portable power tool according to claim 1, wherein said punch means comprises at least one hollow ground chisel shaped lead-in tip.

3. A hand-held portable power tool according to claim 2, wherein said punch means penetrates said abutting steel plates at an inclined plane in relationship to said abutting steel plates.

4. A hand-held portable power tool according to claim 2, wherein said punch means penetrates said abutting steel plates perpendicularly in relationship to said abutting steel plates.

5. A hand-held portable power tool according to claim 3, wherein said punch has a triangular cross-section wherein the triangular cross-section is defined by three points with one of said points being the piercing lead-in tip for penetrating said abutting steel plates.

6. A hand-held portable power tool according to claim 5, wherein said holes created in said steel plates are triangular in shape and said abutting spiral shaped cut-out steel plate segments are triangular in shape with respect to the associated holes created in said steel plates.

7. A hand-held portable power tool according to claim 3, wherein said punch has a rectangular cross-section wherein the rectangular cross-section is defined by four points with two of said points and an edge between said two points being the piercing lead-in tip for penetrating said abutting steel plates.

8. A hand-held portable power tool according to claim 7, wherein said holes created in said steel plates are rectangular in shape and said abutting spiral shaped cut-out steel plate segments are rectangular in shape with respect to the associated holes created in said steel plates.

9. A hand-held portable power tool according to claim 4, wherein said punch has a pair of side-by-side hollow ground chisel shapes, said punch having a pair of side-by-side piercing lead-in tips for entering a back end of holes to be punched in said abutting steel plates whereby when said piercing lead-in tips are driven by said power means into said steel plates, material is punched out of said steel plates to form said holes and is progressively moved to form two abutting spiral shaped cut-out steel plate segments side-by-side in locked fastening engagement to secure the abutting steel plates in unitary assembly.

10. A hand-held portable power tool according to claim 1, wherein the piercing lead-in tip is oriented and positioned to form a corner of the holes being punched.

11. In combination, a hand-held portable power tool and at least two abutting steel plates, said hand-held portable power tool used for joining and fastening said steel plates, the tool comprising:

a housing unit;

clamp means, said clamp means being mounted on said housing unit, said clamp means being movable from an open position to a clamped position, said clamped position being a position that enables said clamp means to hold said abutting steel plates together and prohibit them from moving in relationship to each other;

punch means, said punch means being mounted within said housing unit;

power means, said power means being engageable with said punch means and said clamp means, said power means being of sufficient capacity to clamp and hold said abutting steel plates together and to drive said punch means through said abutting steel plates; and a punch actuator, said punch actuator being attached to said housing unit, said punch actuator being actuatable from an off position to an on position, said clamp means being in an open position and said punch means being in an open position when said punch actuator is in an off position, when said punch actuator is actuated to the on position, said power means engages with said clamp means and moves said clamp means to the clamped position holding said abutting steel plates together and said power means engages with said punch means and drives said punch means through said abutting steel plates, said punch means having a hollow ground chisel shape, wherein an end of said punch means that has the hollow ground chisel shape is used to penetrate the steel plates, said punch means having a piercing lead-in tip for entering a back end of holes to be punched in said abutting steel plates, the hollow ground chisel shape having an angle of between 30°–45° as taken from a bottom edge of said piercing lead-in tip relative to a longitudinal axis through the punch means, whereby when said piercing lead-in tip is driven by said power means into said steel plates, material is punched out of said steel plates to form said holes and is progressively moved to form abutting spiral shaped cut-out steel plate segments in locked fastening engagement to secure the abutting steel plates in unitary assembly.

12. The combination according to claim 11, wherein said punch means penetrates said abutting steel plates perpendicularly in relationship to said steel plates.

13. A hand-held portable power tool according to claim 12, wherein said punch has a pair of side-by-side hollow ground chisel shapes, said chisel shapes having a pair of side-by-side piercing lead-in tips for lead-in entry into a back end of holes to be punched in said abutting steel plates whereby when said piercing lead-in tips are driven by said power means into said steel plates, material is punched out of said steel plates to form said holes and is progressively moved to form two abutting spiral shaped cut-out steel plate segments side-by-side in locked fastening engagement to secure the abutting steel plates in unitary assembly.

14. The combination according to claim 13, wherein each of said pair of side-by-side hollow ground chisel shapes has a triangular cross-section wherein the triangular cross-section is defined by three points with one of said points being the piercing lead-in tip for penetrating said abutting steel plates.

15. The combination according to claim 14, wherein said holes created in said steel plates are triangular in shape and said abutting spiral shaped cut-out steel plate segments are triangular in shape with respect to the associated holes created in said steel plates.

16. The combination according to claim 11, wherein each of said pair of side-by-side hollow ground chisel shapes has a rectangular cross-section wherein the rectangular cross-section is defined by four points with two of said points and an edge between said two points being the piercing lead-in tip for penetrating said abutting steel plates.

17. The combination according to claim 16, wherein said holes created in said steel plates are rectangular in shape and said abutting spiral shaped cut-out steel plate segments are rectangular in shape with respect to the associated holes created in said steel plates.

18. The combination according to claim 11, wherein the piercing lead-in tip is oriented and positioned to form a corner of the holes being punched.

* * * * *